United States Patent Office 2,817,673
Patented Dec. 24, 1957

2,817,673

TRICYCLODECANE ESTERS

Otto Roelen, Oberhausen-Holten, Karl Büchner, Duisburg-Hamborn, Hans Feichtinger, Duisburg-Beeck, Josef Meis, Oberhausen-Osterfeld, and Hans Tummes, Duisburg-Meiderich, Germany, assignors to Ruhrchemie Aktiengesellschaft, Oberhausen-Holten, Germany, a corporation of Germany No Drawing. Application August 3, 1953
Serial No. 372,152

Claims priority, application Germany August 1, 1952

1 Claim. (Cl. 260—410)

This invention relates to new tricyclodecane compounds.

One object of the invention is the production of oxygenated derivatives of methyl tricyclodecane and dimethyl tricyclodecane. This, and still further objects will become apparent from the following description:

The novel compounds according to the invention are esters and/or polyesters of derivatives of methyl tricyclodecane and dimethyl tricyclodecane, respectively, in which methylal groups, methylol groups or carboxyl groups are substituted for the methyl groups.

The starting tricyclodecane derivatives are the following compounds:

| Tricyclodecane - methylal | $C_{11}H_{16}O$ |
| Tricyclodecane - dimethylal | $C_{12}H_{16}O_2$ |
| Tricyclodecane - methylol | $C_{11}H_{18}O$ |
| Tricyclodecane - dimethylol | $C_{12}H_{20}O_2$ |
| Tricyclodecane - carboxylic acid | $C_{11}H_{16}O_2$ |
| Tricyclodecane - dicarboxylic acid | $C_{12}H_{16}O_4$ |

The basic substance of the aforementioned compounds is the dicyclopentadiene (tricyclodecadiene) which may be obtained in the conventional manner from the cyclopentadiene—containing first runnings of the benzene distillation (see VDI-Zeitschrift, vol. 95, 417 (1953)) or from cracked gases. By partially hydrogenating the dicyclopentadiene, there is obtained tricyclodecene-4. These hydrocarbons have the following ring structure:

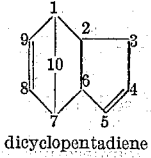
dicyclopentadiene

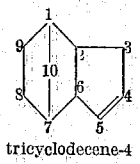
tricyclodecene-4

By the catalytic addition of water gas to dicyclopentadiene by way of the oxo synthesis, there is obtained primary dicyclodecane-dimethylal which by further catalytic addition of water gas is converted into tricyclodecane-dimethylol from which tricyclodecane-dicarboxylic acid is formed by oxidation. In a corresponding manner there is obtained from tricyclodecene-4 by the catalytic addition of water gas the tricyclodecane-methylal and, by further hydrogenation, tricyclodecane-methylol which, by oxidation, may be converted into tricyclodecane-carboxylic acid.

The new esters and polyesters forming therefrom by polymerization are produced from the methylol compounds and carboxyl compounds by esterification. Alcohols or acids of any molecular size are used for the esterification. Starting with formic acid or methanol, all of the known alcohols or carboxylic acids may be used in this manner for the esterification of the corresponding tricyclodecane-methylol compounds or tricyclodecane-carboxyl compounds. It is also possible to esterify the tricyclodecane-methylol compounds with tricyclodecane-carboxyl compounds. It is of advantage in the esterification of the methylol or carboxyl compounds to use an excess of alcohol or acid.

The methylal compounds may be converted into the corresponding esters in different ways. Tricyclodecane-methylal or tricyclodecane-dimethylal may be treated for this purpose with aqueous solutions of alkalis (sodium hydroxide, potassium hydroxide). In doing so, the corresponding esters are partially directly formed by rearrangement of hydrogen, and partially alcohols and carboxylic acids are formed which are subsequently esterified in the conventional manner. In this way, the tricyclodecane-methylal compounds may alone or with the addition of other aldehydes be converted into the corresponding esters.

The new esters in accordance with the invention have novel properties and are excellently suitable as softeners and as high grade lubricating oils.

If solid fatty acids are used for the esterification, wax-like esters are formed which have a relatively low solidification point and penetrometer number. Thus, for example, if stearic acid is used for the esterification, a wax-like ester having 48 carbon atoms is obtained, which has a low solidification point of 33° C. and a penetrometer number of only 21.

If, for example, tricyclodecane-dicarboxylic acid is esterified with lower alcohols, in the range of 1–6 carbon atoms, there are produced ester oils having a specific gravity which ranges above that of water. Similar ester oils will be produced if tricyclodecane-dimethylol is esterified with fatty acids of any source. Thus, for example, an ester produced in this manner with the use of commercial valeric acid has the following characteristics:

| Density at 20° C | 1.025. |
| Refractive index $n_D^{20}$ | 1.4752. |
| Viscosity at 50° C | 3.3° Engler. |
| Viscosity index | 74. |
| Flash point | 193° C. |
| Pour point | −55° C. |

A particular effect may be obtained in addition, by using alcohols or acids of a branched, rather than unbranched, nature. Thus, for example, by esterifying tricyclodecane-dimethylol with a $C_{15}$ fatty acid which is highly branched and consequently liquid at room temperature, there is obtained a liquid ester having 42 carbon atoms in the molecule, a pour point of −28° C., a viscosity of 5.58° Engler at 50° C., and a viscosity index of 118.

If tricyclodecane-dicarboxylic acid is reacted with polyvalent alcohols, there are obtained esters which readily continue to condense into polyesters resulting in the formation of stringy or resin-like products which may be used in the varnish and plastics industry. Esterification with the tricyclodecane-dicarboxylic acid with glycol gives a resin of a molecular weight of approximately 3000, while esterification with glycerine gives infusible and insoluble products of a resin-like nature.

The esterification products obtained by the ester reaction of tricyclodecane-dimethylol and tricyclodecane-dicarboxylic acid are of special interest. If the conventional esterification reaction is followed by an after-treatment in the absence of oxygen under a reduced pressure of 1 mm. Hg while agitating the material being esterified, there is produced light yellow synthetic resins which melt between 130 and 160° C. and have a molecular weight of approximately 5000. These products are of a hard and tough nature.

It is, of course, possible to esterify tricyclodecane-dimethylol into polyesters, using different types of dicarboxylic acids. By esterification with phthalic acid, for example, there is obtained a yellow synthetic resin of the alkyd resin type which has a hard consistency and a molecular weight of about 1500. Esterification products obtained with the use of adipic acid results in plastics of a more stringy nature having molecular weights of 3000 to 4000.

Esters from two similar components may be formed in accordance with the invention if the methylal compounds of tricyclodecane are esterified with themselves.

The following examples are given by way of illustration and not limitation:

Example 1

750 grams of a tricyclodecane-dimethylol containing 95.5% pure dimethylol and having the following characteristics:

| | |
|---|---|
| Density at 50° C | 1.1111. |
| Boiling point | 165° C. (1.5 mm. Hg). |
| Refractive index $n_D^{50}$ | 1.5210. |
| Hydroxyl number | 550. |

C=73.6%
H=10.3%
O=16.1% were mixed with 615 grams glacial acetic acid (150% of the calculated quantity). 6 grams para-toluene-sulfonic acid and 200 cc. benzene were added to this mixture, which was then boiled in a reflux condenser for 12 hours with the separation of water until the splitting-off of water was terminated. During the esterification process, a total of 50 cc. of glacial acetic acid was added corresponding to the neutralization number of the esterification water withdrawn. After the termination of the esterification, the product was washed several times with water or with dilute soda solution to wash out the excess acetic acid. Then it was separated from the solvent by distillation, and fractionated. 850 grams of the tricyclodecane-dimethylol-diacetic acid ester were obtained, which had the following characteristics:

| | |
|---|---|
| Density at 20° C | 1.110. |
| Refractive index $n_D^{20}$ | 1.4879. |
| Viscosity at 50° C | 3.02° Engler. |
| Viscosity index | −108. |
| Molecular weight | 273 (calculated: 280). |
| Ester number | 394 (calculated: 400). |
| Boiling range | 170–175° C. (1.5 mm. Hg). |
| Pour point | −24° C. |

Example 2

335 grams tricyclodecane-dimethylol which had a hydroxyl number of 550 corresponding to a tricyclodecane-dimethylol content of about 96% based on the over-all hydroxyl number, were esterified with 440 grams n-butyric acid (150% of the calculated quantity), 300 cc. benzene and 6 cc. of concentrated hydrochloric acid. After processing effected in accordance with Example 1, the tricyclodecane-dimethylol-dibutyric acid ester was obtained as the ester fraction in a quantity of 525 grams. It had the following characteristics:

| | |
|---|---|
| Density at 20° C | 1.053. |
| Refractive index $n_D^{20}$ | 1.4834. |
| Viscosity at 50° C | 2.39° Engler. |
| Viscosity index | 93.5. |
| Molecular weight | 325 (calculated: 336). |
| Ester number | 315 (calculated: 333). |
| Boiling range | 185–195° C. (0.8 mm. Hg). |
| Pour point | −48° C. |

Example 3

116 grams tricyclodecane-dimethylol were esterified with 350 grams stearic acid with the addition of 3 grams concentrated hydrochloric acid and 300 cc. toluene, as described in the preceding examples. 370 grams of a solid ester of a wax-like nature were obtained. In spite of the low pour point of +33° C. (rotating thermometer), this material had a penetrometer number of only 21. The flash point of this ester was 271° C.; the ester number was 153. This ester was miscible with paraffin wax in any proportion resulting in mixtures the properties of which were fundamentally different from those of the paraffin waxes. The compound had the formula $C_{48}H_{88}O_4$ (molecular weight 728). The molecular weight of the product obtained in accordance with the invention was determined to be 720.

Example 4

146 grams tricyclodecane-dimethylol having a hydroxyl number of 540 were esterified for 15 hours in the manner described in Example 1, with 385 grams branched $C_{15}$ fatty acid having a pour point of −29° C., with the addition of 5 grams concentrated orthophosphoric acid and 200 cc. toluene while stirring the mass. The raw ester, including the diluent, had the following characteristics:

| | |
|---|---|
| Neutralization number | 36 |
| Hydroxyl number | 0 |
| Ester number | 88 |

The free acid which was still present was removed by repeated washing with a 5% soda solution at about 50° C. and the solvent was distilled off. 450 grams of an oily ester were obtained which had the following characteristics:

| | |
|---|---|
| Density at 20° C | 0.943. |
| Viscosity at 50° C | 5.58° Engler. |
| Viscosity index | 118. |
| Pour point | −28° C. |

Example 5

100 grams tricyclodecane-dicarboxylic acid having the characteristics:

| | |
|---|---|
| Melting point | 160–187° C. |
| Neutralization number | 500 |

C=64.4%
H=7.2%
O=28.4% were heated with 31 grams ethylene glycol to 150° C. while stirring the mixture. In doing so, the mixture liquefied giving a clear melt. The influence of the oxygen of the air was eliminated by passing in pure nitrogen. The melt was at first maintained for 20 hours at 150° C. and then for further 15 hours at 200° C. During this time, there developed gradually a brownish discoloration. Finally, the water and the unconverted glycol were completely removed from the melt by the application of vacuum. The melt solidified on cooling, giving a hard, brownish mass which had a neutralization number of 123 and a softening temperature of about 70° C. It was easily soluble in benzene, chloroform, acetic ester and dioxane. After evaporation of the solvents, the solutions left behind a transparent hard varnish of high gloss and good adhesiveness.

Example 6

100 grams tricyclodecane-dicarboxylic acid and 33 grams glycerine were heated for 15 hours at 160° C. in the manner described in Example 1. This resulted in a yellowish-colored blistered product which was as hard as glass and was practically insoluble in organic solvents. On heating to 180° C., it converted into a rubber-like infusible mass.

Example 7

15.6 grams tricyclodecane-dimethylol were esterified for 3 hours with 16.9 grams tricyclodecane-dicarboxylic acid and 0.6 cc. hydrochloric acid in a 60 cc. flask at a temperature of the oil bath of 175° C. while passing through pure nitrogen. Following this, the temperature was increased to 180° C. and the treatment was continued for another hour. The sample which was taken thereafter had the following characteristics:

Neutralization number _____ 19
Ester number _____ 295
Melting point, °C _____ 108–121

The esterification product was heated for ¾ hour at 280° C. while further passing through the nitrogen stream, and subsequently treated for ½ hour at 1 mm. Hg and 280° C. Thereafter, the product had the following characteristics:

Neutralization number _____ 15.
Ester number _____ 290.
Hydroxyl number _____ 56.
Melting point _____ 130° C.
Molecular weight _____ about 5000.
Color (iodine scale) _____ 5–10.
Consistency: _____ solid non-brittle synthetic resin.

Example 8

21 grams tricyclodecane-dimethylol were esterified for 3 hours with 15.2 grams phthalic anhydride, 30 cc. toluene and 1 cc. hydrochloric acid with the use of a reflux condenser. After the removal of the toluene, the esterification product had the following characteristics:

Neutralization number _____ 51
Ester number _____ 278
Hydroxyl number _____ 52
Molecular weight _____ 910

After further treatment of the esterification product for 1 hour at 300° C. under vacuum, a brittle resin was obtained which had a molecular weight of about 1500 and an ester number of 301. The ester number at this molecular weight indicated that about 8 ester groups were present.

Example 9

15 grams tricyclodecane-dimethylol and 11.2 grams adipic acid were esterified in the presence of 0.25 gram hydrochloric acid in the manner described in Example 7. A stringy synthetic resin having molecular weights of between 3000 and 4000 was obtained.

Example 10

100 grams tricyclodecane-dicarboxylic acid were dissolved in 500 cc. methanol. Then dry HCl gas was passed in until the solution was saturated. After heating for one hour on the water bath with the use of a reflux condenser, the unconverted methanol was evaporated and the residue was subjected to fractional distillation under high vacuum. At 143–146° C. (0.5 mm. Hg), 75 grams tricyclodecane-dicarboxylic acid-dimethyl ester were obtained as a homogeneous fraction. The dimethyl ester was a colorless, slightly viscous liquid.

Example 11

100 grams tricyclodecane-dicarboxylic acid were reacted with 500 grams absolute alcohol in the manner described in Example 1. 78 grams tricyclodecane-dicarboxylic acid-diethylester having a boiling point of 153–155° C. at 0.3 mm. Hg were obtained.

Example 12

1000 grams tricyclodecane-dicarboxylic acid were boiled with 3000 cc. dry n-butyl alcohol on the oil bath while passing in HCl gas. The water forming during the esterification was continuously removed with the azeotropically distilling butanol-water mixture. The residue was fractionated under high vacuum resulting in 900 grams pure tricyclodecane-dicarboxylic acid-dibutyl ester having the following characteristics:

Boiling point _____ 186–189° C. (0.3 mm. Hg).
Density at 20° C _____ 1.050.
Refractive index $n_D^{20}$ _____ 1.4800.
Iodine number _____ 1.
Neutralization number _____ 3.
Ester number _____ 326 (333).
Flash point _____ 197° C.
Pour point _____ –50° C.
Hydroxyl number _____ 3.
Carbonyl number _____ 2.
Viscosity index _____ 111.
Viscosity at 30° C _____ 4.02° Engler.
Viscosity at 50° C _____ 2.21° Engler.

Example 13

100 grams tricyclodecane-dicarboxylic acid were reacted with 300 cc. n-hexyl alcohol in the manner described in Example 3. In the subsequent high vacuum distillation, 95 grams tricyclodecane-dicarboxylic acid-dihexyl ester were obtained as a viscous, faintly yellowish-colored liquid having a boiling point of 201–203° C. (0.1 mm. Hg).

Example 14

Tricyclodecene-4 was obtained from dicyclopentadiene by partially hydrogenating a double bond by the process disclosed in our co-pending application Serial No. 357,388. From this unsaturated hydrocarbon, tricyclodecane-methylal was produced by the catalytic addition of carbon monoxide and hydrogen. This tricyclodecane-methylal was heated with 5% of its weight of sodium hydroxide with a reflux condenser, the sodium hydroxide being used in the granular form. During the distillation, the mass thickened in a progressive manner. After 5 hours, the product was diluted with water and mixed with sufficient mineral acid (sulfuric acid) to obtain a hydrogen ion concentration of approximately pH 2.

The oily phase of the reaction product thus separated as the upper layer was washed several times with water. Thereafter, the esterification was effected in the conventional manner with the addition of 1% of p-toulene-sulfonic acid and 20% of the volume of toluene by boiling with a reflux condenser and splitting-off of water. The esterified product was fractionated. This resulted in a main fraction which boiled at 200° C. (0.8 mm. Hg) and consisted of the ester of tricyclodecane-methylol with tricyclodecane-carboxylic acid.

This ester was of a water-white color (iodine color No. = 0) and consisted of an odorless, viscous liquid which slowly crystallized in a coarse form and solidified at 15° C. giving a glass-like mass. The molecular weight was determined to be 327 (calculated 328). The density at 20° C. was 1.094 and the refractive index $n_D^{20}$ was 1.5261.

After saponification for 2 hours, the following characteristics were obtained:

Ester number _____ 165 (calculated: 171).
Neutralization number _____ 0.5.
Hydroxyl number _____ 1.
Viscosity at 30° C. _____ 847 cst.
Viscosity at 50° C. _____ 202 cst.
Viscosity at 80° C. _____ 45.3 cst.
Viscosity index _____ 52.
Flash point _____ 248° C.

We claim:
An ester having the formula

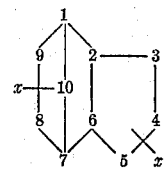

in which $x$ is a member selected from the group consisting of —COOCH$_2$R and —CH$_2$OOCR radicals, R representing a hydrocarbon radical having up to 17 carbon atoms selected from the group consisting of aliphatic and aromatic hydrocarbon radicals.

References Cited in the file of this patent

UNITED STATES PATENTS

| | | |
|---|---|---|
| 2,688,627 | Cohen et al. | Sept. 7, 1954 |
| 2,716,662 | Cohen et al. | Aug. 30, 1955 |
| 2,738,370 | Staib et al. | Mar. 13, 1956 |

OTHER REFERENCES

Ring Index, Patterson et al., 1940, p. 275.
Elsevier, 13, 1030–1 (1946), Elsevier Publ. Co.
Chem. Abst. (Index), 43, 11167 (1949).
Reppe et al.: Chem. Abst., 43, 6197–9 (1949).